Patented Oct. 3, 1922.

1,430,667

UNITED STATES PATENT OFFICE.

GLENN WALTER MERREFIELD, OF JOHNSTOWN, PENNSYLVANIA.

THERMIT MIXTURE.

No Drawing.  Application filed October 25, 1921.  Serial No. 510,372.

*To all whom it may concern:*

Be it known that I, GLENN WALTER MER-REFIELD, a citizen of the United States, and resident of Johnstown, in the county of Cambria and State of Pennsylvania, have invented certain new and useful Improvements in Thermit Mixtures, of which the following is a specification.

My invention relates to thermit mixtures, and more particularly relates to a thermit mixture for manganese steel.

The main object of my invention is to provide a new mixture of the class described, for welding manganese steel and repairing manganese steel castings, which when ignited will produce an alloy having a substantial manganese content to compensate for the loss in operation.

I have discovered that a mixture composed of from 11 to 13 per cent of granulated aluminum, which is sufficiently fine to pass through a 20 to 30 mesh screen, 70 to 72 per cent of iron oxide, preferably in the form of mill scale, 10 to 12 per cent of low carbon steel particles, preferably in the form of punchings, and 6 to 9 per cent of crushed ferromanganese which is sufficiently fine to pass through a 10 mesh screen, will when properly used form a perfect weld with manganese steel and manganese steel castings.

The preferred and ideal mixture, composed of the above ingredients is, 12 per cent of aluminum, 71 per cent of iron oxide, 10 per cent of low carbon steel and 7 per cent of ferromanganese.

The iron oxide and low carbon steel while preferably used in the form of mill scale and punchings, respectively, of course, may be used in any desired form, although the mill scale and punchings are readily available to those in the art.

The advantages of my invention will be readily apparent to those skilled in the art.

By the inclusion of the ferromanganese in the mixture a manganese alloy is formed after the mixture has been ignited and the reaction completed, which alloy has a great affinity for manganese steel.

Changes in proportions within the scope of the appended claims may be readily made by those skilled in the art.

I claim:—

1. A thermit mixture for manganese steel composed of 11 to 13 per cent of aluminum, 70 to 72 per cent of iron oxide, 10 to 12 per cent of low carbon steel, and 6 to 9 per cent of ferromanaganese.

2. A thermit mixture for manganese steel composed of 12 per cent of aluminum, 71 per cent of iron oxide, 10 per cent of low carbon steel, and 7 per cent of ferromanganese.

3. A thermit mixture for manganese steel composed of 12 per cent of granulated aluminum adapted to pass through a 20 to 30 mesh screen, 71 per cent of iron oxide in the form of mill scale, 10 per cent of low carbon steel in the form of small pieces, such as punchings, and 7 per cent of crushed ferromanganese adapted to pass through a 10 mesh screen.

In testimony whereof, I have hereunto signed my name.

GLENN WALTER MERREFIELD.